June 15, 1926.
N. A. CHRISTENSEN
1,588,659
VEHICLE BRAKE CONTROL VALVE
Filed August 1, 1924   3 Sheets-Sheet 1
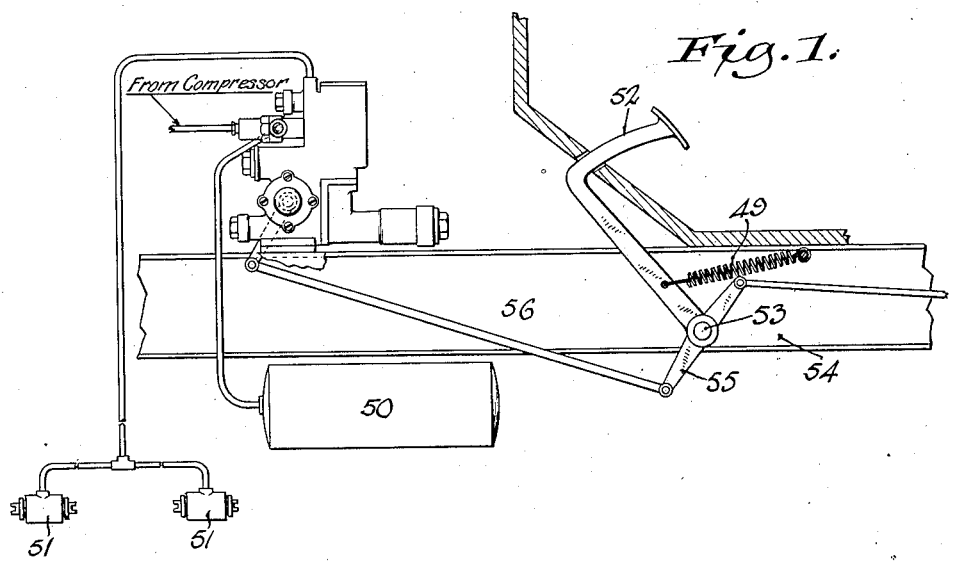
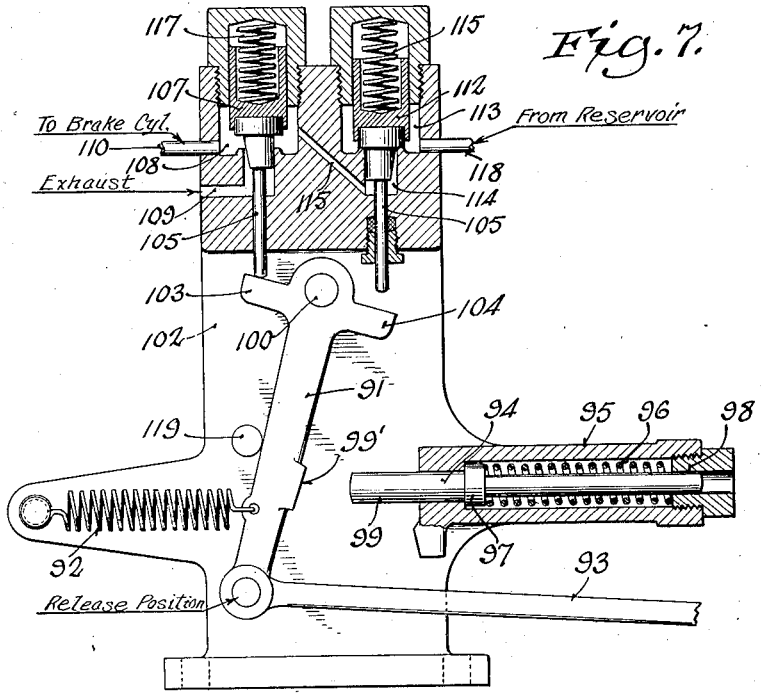
INVENTOR.
NIELS A. CHRISTENSEN
BY
Quarles & French
ATTORNEYS.

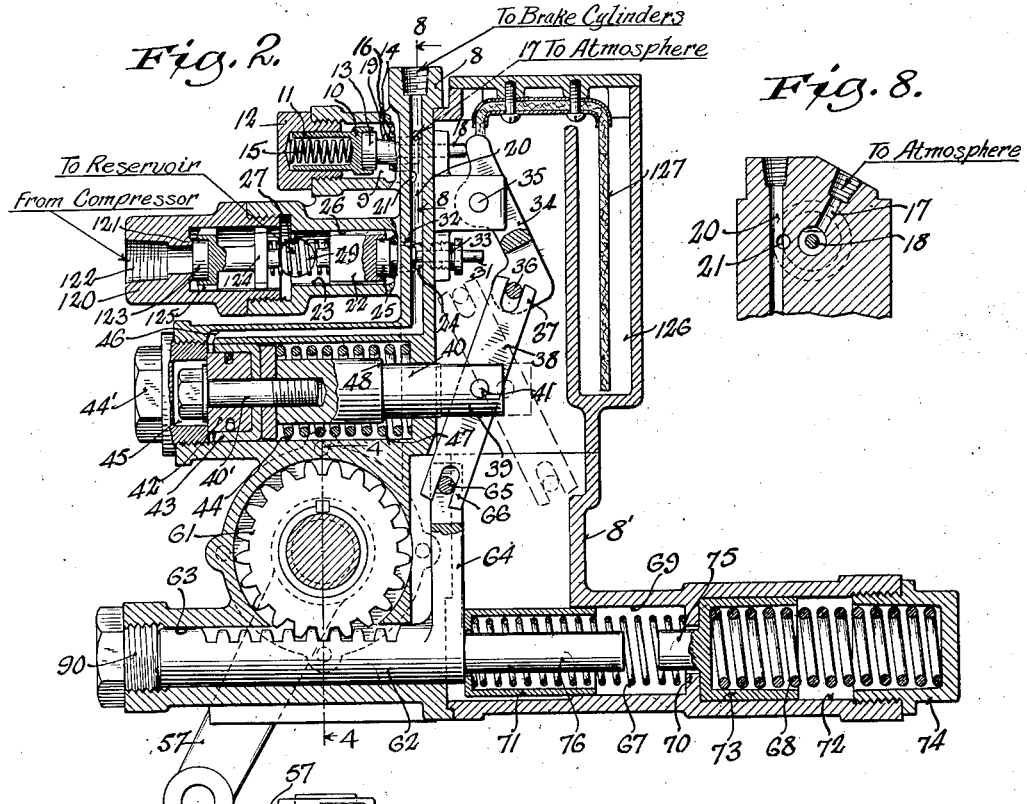

June 15, 1926.
N. A. CHRISTENSEN
1,588,659
VEHICLE BRAKE CONTROL VALVE
Filed August 1, 1924  3 Sheets-Sheet 3
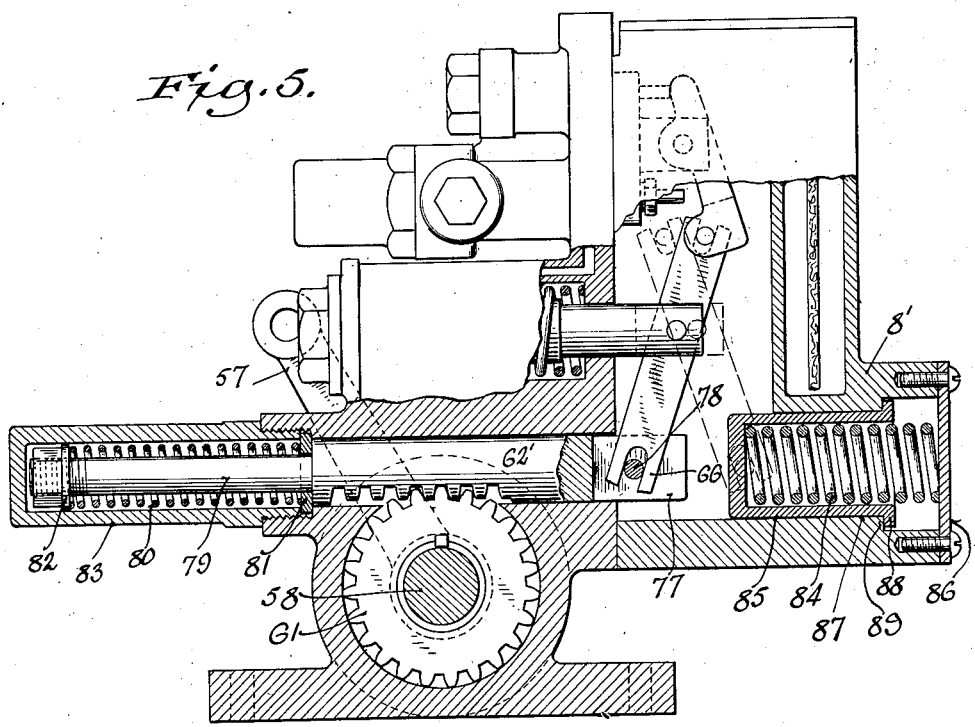
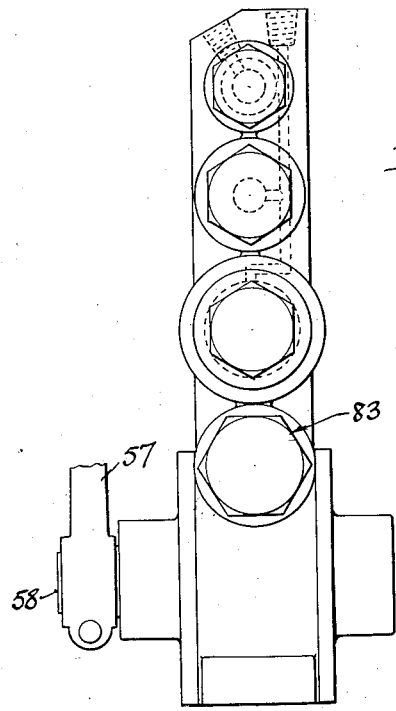
INVENTOR.
NIELS A. CHRISTENSEN
BY
Quarles & French
ATTORNEYS.

Patented June 15, 1926.

1,588,659

UNITED STATES PATENT OFFICE.

NIELS A. CHRISTENSEN, OF MILWAUKEE, WISCONSIN.

VEHICLE BRAKE-CONTROL VALVE.

Application filed August 1, 1924. Serial No. 729,500.

The invention relates to air-brake-control mechanism for braking systems, more particularly those used in connection with automotive vehicles and trailers for such vehicles.

The object of this invention is to provide an air-brake-control-valve mechanism in which the braking pressure may be readily controlled by the operator of the vehicle, so that said pressure may be readily varied by the operator to secure the desired brake application pressure, with provision for indicating to the operator the amount of braking pressure he is applying, and is more particularly designed for foot operation, although not necessarily limited thereto.

The invention is further designed to improve upon the control-valve mechanism of my copending application Serial No. 705,-
363, filed April 9, 1924, by the association of feeler mechanism therewith to aid the operator in his operation of said mechanism.

The invention further consists in the several features hereinafter set forth and more particularly defined by claims at the conclusion hereof.

In the drawings: Fig. 1 is an elevation view of brake-control-valve mechanism embodying the invention, showing it applied to an automotive vehicle and associated with the foot-pedal;

Fig. 2 is a vertical sectional view of the brake-control-valve mechanism shown in Fig. 1 and taken along the line 2—2 of Fig. 3;

Fig. 3 is a plan view of the mechanism shown in Fig. 2;

Fig. 4 is a detail sectional view taken on the line 4—4 of Fig. 2;

Fig. 5 is an elevation view, partly in section, of a preferred form of mechanism embodying the invention;

Fig. 6 is an end view of the mechanism shown in Fig. 5;

Fig. 7 is a vertical sectional view through a modified form of mechanism embodying the invention;

Fig. 8 is a detail sectional view taken on the line 8—8 of Fig. 2.

Referring to Figs. 1 to 4, inclusive, the structure shown includes a casing 8 having a relief valve chamber 9, a relief valve 10 having a tubular portion 11 slidably mounted in the bore of a box-nut 12 and provided with a head 13 of composition material inset in said tubular portion and automatically closed or urged against its seat 14 by a spring 15 mounted in the bore of the portion 11 and interposed between the end of said bore and the outer end of the bore in the nut 12, said valve controlling the passage of air from a duct 16 to a duct 17 leading to atmosphere and being opened by a push-pin 18 slidably mounted in said casing and engageable with said head 13. The head of this pin 18 fits closely in the bore formed by the duct 16 with the exception of a wedge-shaped face 19 which gradually increases the effective port opening as this pin is pushed in toward the valve for the application of the operating means. The stem of the pin 18, slidably mounted in a bore in the casing smaller than the duct 16, projects outside of the valve casing. A duct 20 which communicates with the brake system is connected by a duct 21 with the chamber 9. Thus, opening the valve 10 will relieve the pressure in the brake system by passage of air through ducts 20, 21, 16 and 17 to atmosphere.

An inlet valve 22 works in a bore 23 in the casing and controls passage of compressed air through a duct 24 to a conduit or duct 20. This valve 22 has a head 25 inset in a cylindrical block or stem portion having flattened sides 20 so that the air may pass by the stem portion. Air from the reservoir is introduced into the bore 23 through either one of two tapped openings 27, the other one being closed off by a pipe-plug 28. Said valve 22 is normally held in a closed position by a spring 29 which is here shown interposed between said valve and the base of a check-valve 30, said inlet valve being operated by a pin 31 similar in all respects to pin 18 and similarly mounted in the casing and provided with a wedge-shaped face 32 to gradually increase the passage of air from bore 23 to duct 24 as the inlet valve opens. This pin 31 has a stuffing box 33, of usual construction, for its stem. The pins for the inlet valve 22 and the relief valve 10 are operated by a simple lever 34 pivotally mounted intermediate its ends between the stems of the pins, on a pin 35 carried by the casing, and said lever has a forked end carrying a pin 36 engaged by the slotted upper end 37 of an operating lever 38.

The lever 38 is pivotally mounted intermediate its ends in the forked end 39 of a fulcrum-shifting-rod or support 40 to which it is connected by a pivot pin 41. The connection between the end 37 of said lever and the lever 34 forms a lost-motion connection between them which provides for a "lap" position of the valves. The rod 40 is slidably mounted in the casing and secured by a bolt 40' to the head 42 of a suitably packed piston 43 which works in the bore 44 of the casing 8 and cooperates therewith and with an end-plug 44' to form a pressure chamber 45 which connects by a duct 46 with the duct 20, whereby the pressure of air in the brake system is used to shift the rod 40 and hence change the fulcrum point of the lever 38. This pressure is counteracted by a spring 47 interposed between the inner end of the bore 44 and the piston head, and the piston is also limited in its movement by a shoulder 48 on said rod engageable with the inner end of the bore 44.

Normally when no force is applied to the operating lever 38, the relief valve 10 is held open by the engagement of the lever 34 with the stem 18 of said valve, said lever having been moved to this position and retained therein by the position of the operating lever 38 and by the spring 47 and the spring 49, which then holds the fulcrum point or pin 41 in one of its extreme positions, and in that position this fulcrum point is relatively fixed. If it is then desired to apply the brakes the lever 38 is swung from its full-line position in Fig. 2 toward its dotted-line position, with the result that lever 34 swings out of operative connection with the pin 18, allowing relief valve 10 to close, and comes into operative engagement with the pin 31 for the inlet valve 22, operating thereon to open said valve and allow compressed air from the tank or reservoir 50 to enter the system. When the air enters the braking system this air is also conducted to the piston chamber 45 and acts to shift the rod 40 outwardly against the action of the spring 47 and builds up a pressure sufficient to overcome it and cause a travel of the piston, and therefore the rod 40 associated with it, outwardly in direct proportion to the intensity of the pressure in the braking system, and causes the fulcrum point for the operating lever 38 to move outwardly, the lower part of the lever being held in position by the parts moved by the operator, as hereinafter described.

This outward shifting of the fulcrum 41 causes the lever 34 to swing away from the inlet-valve-operating pin 31 and thereby permits the inlet valve 22 to close, and at the same time this lever swings toward the operating pin 18 for the relief valve, but not so far as to move said pin as the lever 34 is then in its "lap" position due to the lost-motion between the ends of the lever 34 and the operating pins and the levers 34 and 38 because of the pin-and-slot connection previously described which allows both valves 10 and 22 to retain their seats. Thus, on a certain limited swing of the operating lever 38 air is admitted to the brake system and a certain braking pressure applied to the brakes through the pistons, not shown, operating in the brake cylinders 51, and the operating means is in a "lap" position in which both valves are closed and neither is again opened except by further movement under the control of the operator of the lever 38. If it is desired to increase the braking pressure the lower part of lever 38 is swung further away from the bore 44, by the operator, as hereinafter described, the fulcrum on the rod 40 remaining stationary during this operation because of the balance between the brake pressure and the spring pressure, and this movement will again move the lever 34 and cause it to open the inlet valve, admitting more compressed air to the brake system and augmenting the pressure therein so that the fluid-pressure-operated rod 40 is again moved outwardly to still further compress the spring 47, the tension of which is constantly increasing as it is compressed, and said rod will move outwardly and cause the fulcrum point 41 of the lever 38 to again assume another position at this higher pressure which will again cause the movement of the lever 34 to allow the inlet valve 22 to close without releasing the pressure in the brake system while the lever 38 is retained in this new position. Then further movement of the lever 38 by the operator, in the same direction, increases the braking pressure and in this way the pressure of air in the braking system may be controlled by the operator, and particularly from the foot-pedal, since the more he pushes down on said pedal the more air is admitted to the brake system and the greater the pressure becomes on the brakes so that the degree of braking pressure may be nicely controlled.

Thus far the action of the control valve mechanism has been described without reference to the particular connection between the operating lever 34 and the operator's foot-pedal 52. As shown in Fig. 1, the foot-pedal 52 is pivotally mounted on a pin 53 carried by a frame 54 of the vehicle, and is normally held in one position by a spring 49. The pedal is also shown as provided with an arm 55 which is operatively connected by a link 56 with the lever or arm 57 which is keyed or clamped to an oscillatory shaft 58 journalled in bearing plates 59 secured by screws 60 to the main casing 8. A gear 61 is keyed to the shaft 58 and meshes with a rack 62 slidably mounted in a bore 63 in the casing. This rack is provided with a laterally-extending arm 64 carrying a pin 65 engageable with the slotted lower end 66 of the operating lever 34, from which it will be noted that when the operator presses down on the pedal 52 the link 56 will move rearwardly swinging the lever 57 toward the pedal, causing the rack 62 to swing the lower end 66 of the lever from its full toward its dotted-line position which, as previously described, causes the operation of the lever 34 in the manner above described.

In order that the operator may know the relative amount of brake pressure he is applying, feeler mechanism is associated with the rack 62, consisting of a light spring 67 and a heavier spring 68 so associated with the rack that during the first part of the rack's movement the operator moves the pedal 52 against the light spring 67 and thereafter, upon an increase of braking pressure, moves the pedal against the action of the spring 68, and because of the difference in the force he must apply to overcome the resistance of these springs he knows whether he is applying the brakes or is making a light or a heavy application thereof.

The spring 67 is mounted in a bore 69 formed as a part of the casing 8 between the rack and an apertured partition 70 of said casing, the end of the spring adjacent the rack being preferably surrounded by a sleeve 71 which slides in the bore 69. The spring 68 is mounted in a bore 72 between a cup-shaped end 73 of a cap member slidably mounted in the bore 72 and an end cap 74. This cap member, including the part 73, also includes a pin or stop portion 75 extending through an opening in the partition 70 and adapted to be engaged by an extension 76 on the rack working within the coils of the spring 67. With this construction it will be noted that as rack 62 moves toward the right the spring 67 is first put under compression, and as the movement of the rack continues the pin 76 engages the pin 75 and then further movement causes a compression of the spring 68.

It will be noted from the construction shown in Fig. 2 that both these springs are arranged on the same side of the rack and that the gear 61 is interposed between the rack and that part of the casing housing the valves and the shiftable rod 40.

In Figs. 5 and 6 I have shown a preferred form of construction which so far as the inlet valve, relief valve, the rod 40, the piston 43 and the levers 34 and 38 are concerned, is the same as that previously described except that the lever 38 is made longer, but the operating mechanism for the lever 38 and the feeler mechanism associated therewith is more compactly arranged, as shown in detail in Fig. 5, where the arm 57 is connected to the shaft 58 now arranged below the rack 62' and carrying the gear 61 meshing with the rack, said rack in this construction being a round rod having a slotted end 77 carrying the pin 78, similar to the pin 65, and engaging with the lower slotted end 66 of the lever 38. One end 79 of the rack is of a reduced diameter and a weak spring 80 interposed between a relatively stationary washer 81 and a washer 82 on said reduced end 78 servies to normally hold the rack 62' in a position in which the lever 38 holds the lever 34 in its full-line position with the relief valve 10 open. The spring and the end 79 of the rack are enclosed by a cap member 83. A strong spring 84 is mounted between the closed end of a slidable hollow stop member 85 and an end plate 86 secured to the cover 8' of the casing. This stop member 85 is slidably mounted in a bore 87 and has an outwardly extending flange 88 cooperating with a shoulder 89 on the cover section 8' to limit its extreme movement toward the rack 62'. The mounting for the shaft 58 is the same as that shown in Fig. 4 of the previously described construction.

With this construction the same effect is produced as with the construction shown in Fig. 2, for as the operator presses down on the foot-pedal 52 and thereby swings the lever 57 toward the right he first compresses the weak spring 80 and then the end 77 of the rack 62 engages the closed end of the stop member 85, and a further movement of the rack causes the compression of the heavier spring 84 which indicates to the operator that he is making a heavier, or in some instances an emergency, application upon the brake.

In both constructions above described it will be noted that the use of removable end plates 59 permits the shaft 58 being reversed and the arm 57 to be placed on either side of the casing, and the arm 57 can be positioned up or down, depending upon the connections with the pedal with which the device is to be associated.

In Fig. 2 the rack is limited in its travel in one direction by a removable plug 90, and in Fig. 5 by the washer 81.

By stepping on the air-brake-application pedal which, as previously described, is attached to the arm 57, the rack 62 or 62' moves and causes the operating levers to move to effect the opening of the inlet valve. Just before this opening takes place the rack comes into engagement with the stop associated with the strong spring 68 or 84 so that there is a distinguishable difference in the operator's exertion when this point has been reached and the inlet valve is about to open. The opening of the inlet valve takes place by moving slightly against the action of the strong spring. Air will then be admitted to the brakes, the compensating piston comes into action, and the inlet valve is by it automatically closed without further pressure upon exhaust or relief valve, as previously described. An addition to the application of pressure can be readily make by slightly further depressing the foot-pedal, causing another action of the compensating piston, as above. The various times for operation may, of course, be varied in this mechanism to suit the convenience of the operator, for instance, the mechanism can be so built that a light application takes place before the rack actually comes under the action of the strong spring, or in any of the other positions between application and relief most advantageous for use of the general operator.

With this construction also there is no abnormal strain on any of the pins or smaller parts of the valve mechanism, as the strains are entirely taken up by the rack and pinion and the pinion's operating lever, which can be made strong enough to stand strains produced by a clumsy or rough operation of the foot-pedal.

Another feature of this construction lies in the universal adaptation of the lever attachment between this valve and the foot-pedal. As noted before, this lever can be set either at the right or left hand side of the valve, to suit location requirements. The lever may also be set in any position of the circle in relation to the rack so as to get correct angles of operation between this lever and the foot-pedal. This includes the the possibility of having a differential motion of the angles of this lever as related to the motion of the foot-pedal so that the motion of the foot-pedal may be considerably varied by making the active radius of the valve-operating lever long or short according to the position of the gear in the rack so that the first motion for application to the foot-pedal may be short or long as compared with the further motion for further application.

In the modification shown in Fig. 7, I have shown another form of feeler mechanism associated with the control valve, in which the operating lever 91 is held in a normal position by a light spring 92 and which, through a link 93 operatively connected to a brake pedal of the vehicle, such as the pedal 52, is swung to an operative position and during this movement engages a plunger stop member 94 slidably mounted in a housing 95 and acted upon by a strong spring 96 interposed between a shoulder 97 on the plunger and a plug 98 in the housing 95, the exterior end 99 of the plunger contacting with a flat face 100 of the lever 91.

The lever 91 is pivotally mounted on a pin 101 carried by a casing 102 of the mechanism, and has arms 103 and 104 engageable with valve-operating pins 105 and 106. The relief or exhaust valve 107 controls the exhaust of air from a chamber 108 to the exhaust conduit 109 leading to atmosphere, the chamber 108 being in communication with the brake system through a pipe 110. The inlet valve 112 controls the passage of compressed air from a chamber 113 to a duct 114 which communicates with a duct 115 leading to the chamber 108. The inlet valve is normally closed by a spring 116 and the relief valve is automatically closed by a spring 117. The valves 107 and 112 and their association with the casing and with the springs are the same as the construction of the relief valve 10 shown in detail in Fig. 2, previously described. The operating pins 105 and 106 are the same as the operating pins 18 and 31, previously described, and operate in a similar manner to control the passage of air from the chambers 108 and 113 to the conduits or ducts 109 and 114, respectively. The pipe 118 conducts air from the reservoir to the chamber 113.

With this construction there is no compensating action but a movement of the lever 91 toward the right permits the exhaust valve to close and opens the inlet valve 112 through the operation of the pin 106, causing the air from the reservoir to pass to the brake system through the conduits above described, and the feeler mechanism, including the strong spring 96, may be so positioned relative to the movement of the lever 91 as to cause an opening of the inlet valve just before or after the movement of the lever 91 starts to compress the strong spring 96 by the operator's application of the foot-pedal. Upon the release of the foot-pedal the lever 91 moves back and its arm 103 engages the pin 105 to open the relief valve 107, causing the air from the brake system to pass to atmosphere through the duct 109. The movement of the lever 91 is limited in its release position by a stop pin 119.

In Figs. 2 and 5 provision has been made to secure a compact arrangement and reduce the length of piping, as the check valve 30 usually placed in the pipe line is incorporated directly in the device by providing a fitting 120 having threaded connection with the enlarged threaded end of the part forming the bore 23 of the casing and having a valve seat 121 controlling the passage of compressed air from the compressor through the inlet 22 to the bore 23, and against which the composition head 123 of the valve 30 seats.

The stem of the valve 30 is guided in the bore formed in the fitting 120 by having enlarged parts 124 in sliding contact therewith but flattened at different places, as indicated at 125, to permit the air from the compressor to pass to the reservoir through either one of the openings 27.

Provision is also made in constructions shown in Figs. 2 and 5, for lubricating the operating means by providing a vertically disposed lubricating oil supply chamber 126 and a wick 127 hanging down into said chamber and extending over and down adjacent the lever 34 so that oil drawn out of said chamber by said wick will be rubbed on the lever 34 and run over said lever and hence reach the lever 38 and its connection with the lever 34, and also reach the exposed ends of the operating-pins.

From the foregoing description it will be noted that I have provided, first, an indicating or feeler mechanism by which the operator, upon the application of the foot-pedal, will sense the beginning and extent of such application which will, of course, prevent the operator carelessly applying the brakes through inadvertently putting his foot on the brake pedal. I have also provided, in the preferred form of the invention, a construction in which those parts directly associated with the foot-pedal are strong enough to take the strains occasioned by unskillful or rough application of the foot-pedal and thus preventing derangement of the more sensitive parts of the valve-operating mechanism.

What I claim as my invention is:—

1. In air-brake-control-valve mechanism of the class described, the combination with a brake system, of inlet and exhaust valves respectively controlling the supply of air to and the exhaust from said system, means including a foot-pedal for operating said valves, and feeler mechanism associated with said means to notify the operator of his operation of said foot-pedal and to apprise him of the fact that he is making a brake application.

2. In air-brake-control-valve mechanism of the class described, the combination with a brake system, of inlet and exhaust valves respectively controlling the supply of air to and the exhaust from said system, means including a foot-pedal for operating said valves, and feeler mechanism including a weak and a strong spring associated with said means to notify the operator of his operation of said foot-pedal and to apprise him of the fact that he is making a brake application.

3. In air-brake-control-valve mechanism of the class described, the combination with a brake system and the control valves therefor, of means associated with said valves including pins for operating them, and means associated with the foot-pedal for actuating said operating means constructed and arranged to relieve said pins of abnormal strains occasioned by careless operation of the foot-pedal.

4. In air-brake-control-valve mechanism, the combination with a brake system, of control valve mechanism associated therewith, operating means for said valve mechanism including a foot-pedal, a gear and a rack meshing with said gear, and spring means associated with the rack to notify the operator of his operation of said foot-pedal and to apprise him of the fact that he is making a brake application and the extent of such application.

5. In air-brake-control-valve mechanism, the combination with a brake system, of control valve mechanism associated therewith, operating means for said valve mechanism including a foot-pedal, a shaft operatively connected with said pedal, a gear on said shaft, a rack meshing with said gear, means permitting the angular adjustment of said gear relative to said rack for determining the initial position of operation, and spring means associated with the rack to provide a feeler for the operator in his operation of said feet-pedal.

6. In air-brake-control-valve mechanism, the combination with a brake system, of inlet and exhaust valves respectively controlling the supply of air to and exhaust from said system, an operating lever for said valves, compensating means for varying the position of said operating lever in accordance with the braking pressure existing in said system, means including a foot-pedal for actuating said operating lever, and feeler mechanism distinct from said compensating means and associated with said last-named means.

7. In air-brake-control-valve mechanism, the combination with a brake system, of inlet and exhaust valves respectively controlling the supply of air to and exhaust from said system, an operating lever for said valves, compensating means for varying the position of said operating lever in accordance with the braking pressure existing in said system, a slidable member, under the control of the operator, for moving said operating lever, and a feeler mechanism including a weak and a strong spring associated with said slidable member.

8. In air-brake-control-valve mechanism, the combination with a brake system, of inlet and exhaust valves controlling the supply of air to and exhaust from said system, an operating lever for said valves, a slideable member, under the control of the operator, for moving said operating lever, and feeler mechanism including a weak spring associated with said slidable member and a strong-spring-pressed abutment engageable with said slidable member.

9. In air-brake-control-valve mechanism, the combination with a brake system, of inlet and exhaust valves respectively controlling the supply of air to and exhaust from said system, an operating lever for said valves, a foot-pedal-oscillated gear, a rack meshing with said gear and operatively connected with said operating lever, and feeler mechanism including a weak and a strong spring associated with said rack.

10. In air-brake-control-valve mechanism of the class described, the combination with a brake system, of inlet and exhaust valves respectively controlling the supply of air to and exhaust from said system, means including a foot pedal for operating said valves, and feeler mechanism, distinct from said valves, associated with said means to notify the operator of his operation of said foot-pedal and to apprise him of the fact that he is making a brake application.

In testimony whereof, I affix my signature.

NIELS A. CHRISTENSEN.